(12) United States Patent
Cheng

(10) Patent No.: US 6,318,401 B1
(45) Date of Patent: Nov. 20, 2001

(54) AIR VALVE ASSEMBLY FOR HYDRAULIC JACK

(75) Inventor: Hsien-Pi Cheng, Chia-I (TW)

(73) Assignee: Shinn Fu Corporation, Tao Yuan (TW)

( * ) Notice: Subject to any disclaimer, the term of this patent is extended or adjusted under 35 U.S.C. 154(b) by 0 days.

(21) Appl. No.: 09/597,562

(22) Filed: Jun. 20, 2000

(51) Int. Cl.$^7$ ................................... F16K 24/04
(52) U.S. Cl. ............................................ 137/197
(58) Field of Search ........................... 137/197, 587, 137/588, 171

(56) References Cited

U.S. PATENT DOCUMENTS

| | | | |
|---|---|---|---|
| 2,734,521 | * | 2/1956 | Hencken ............................ 137/197 |
| 2,776,671 | * | 1/1957 | Ferguson ........................... 137/197 |
| 3,086,542 | * | 4/1963 | Mosier ............................... 137/102 |
| 3,631,877 | * | 1/1972 | Barosko ............................. 137/102 |
| 4,467,827 | * | 8/1984 | Pasbrig .............................. 137/197 |

\* cited by examiner

Primary Examiner—Kevin Lee
(74) Attorney, Agent, or Firm—Varndell & Varndell, PLLC

(57) ABSTRACT

An air valve assembly adapted for use in a hydraulic jack and constructed to include a valve block, the valve block having a threaded front neck for mounting, a longitudinal center through hole, and a radial air hole in communication between the longitudinal center through hole and the atmosphere, an air guide block mounted inside the valve block, the air guide block having a spiral groove around the periphery in communication between two distal ends of the longitudinal center through hole of the valve block, a stop plate fixedly mounted inside the valve block above the air guide block, the stop plate having a center round hole for the passing of fluid, and a felt element fixedly mounted inside the valve block and attached to the stop plate at the top and aimed at the radial through hole of the valve block to stop hydraulic oil from passing out of the center round hole of the stop plate and to let outside air pass from the radial through hole of the valve block through the center round hole of the stop plate into the space inside of the valve block below the stop plate.

6 Claims, 7 Drawing Sheets

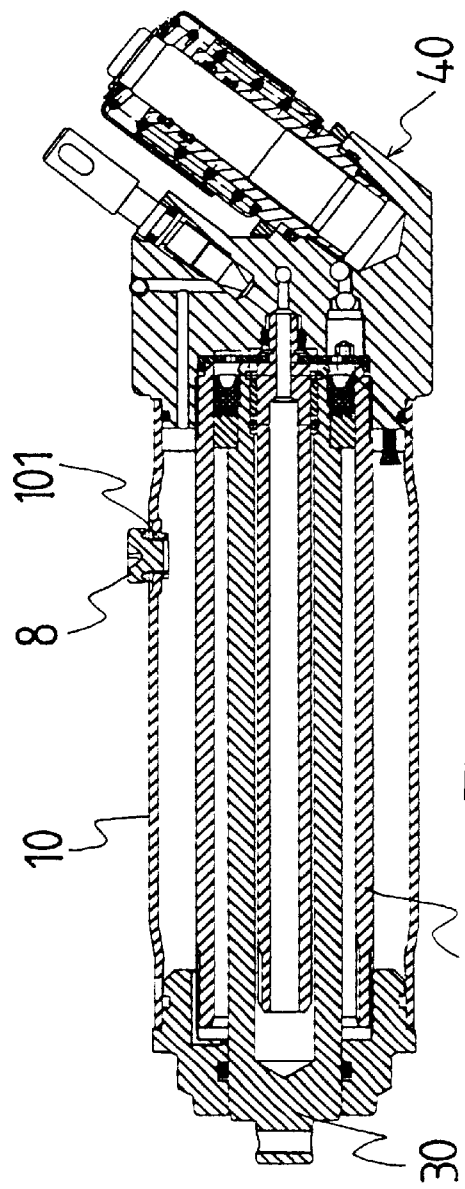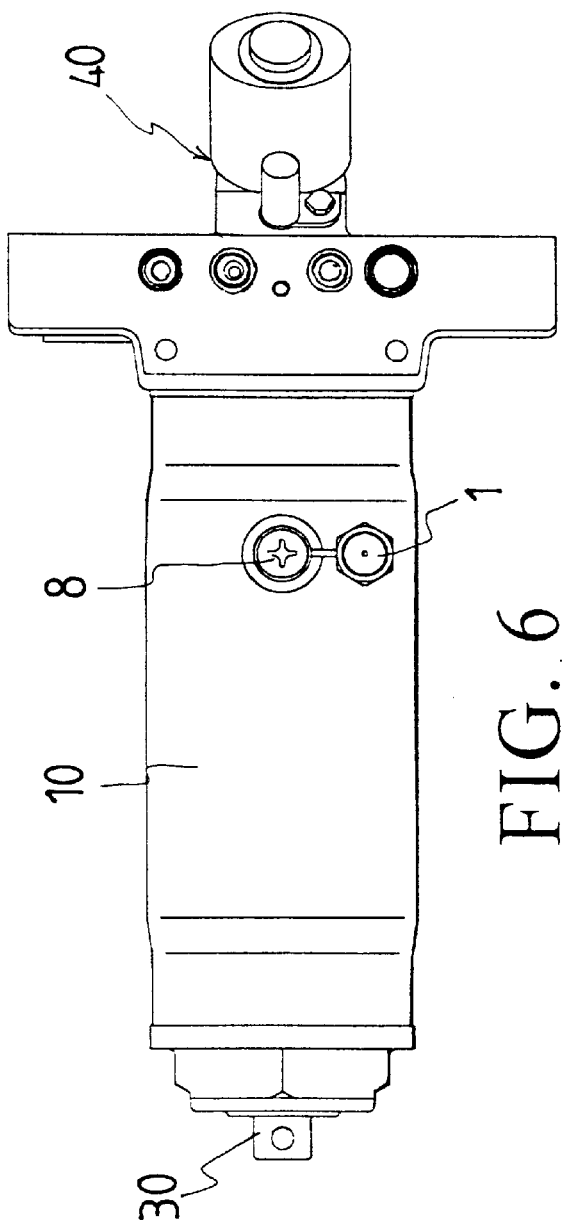

AIR VALVE ASSEMBLY FOR HYDRAULIC JACK

BACKGROUND OF THE INVENTION (a) Field of the Invention

The present invention relates to an air valve assembly for hydraulic jack, and more particularly to such an air valve assembly, which can be easily installed in the oil cylinder of a hydraulic jack keep the internal pressure of the hydraulic jack in balance with the atmospheric pressure, and to prevent hydraulic oil from leaking out.

(b) Description of the Prior Art

The oil cylinder structure (see FIG. 2) of a conventional hydraulic jack (see FIG. 1) is generally comprised of an outer oil cylinder 10, an inner oil cylinder 20, a movable rod member 30, and a valve block 40. The inner oil cylinder 20 is fixedly mounted inside the outer oil cylinder 10. The rod member 30 is installed in the inner oil cylinder 20, and partially extended out of the front side of the outer oil cylinder 10. The valve block 40 is fixedly fastened to the outer oil cylinder 10 and the inner oil cylinder 20 at the rear side. Further, hydraulic oil is filled in the outer oil cylinder 10. When in use, the valve block 40 is operated to cause a suction force, which sucks hydraulic oil from the outer oil cylinder 10 into the inner oil cylinder 20. When hydraulic oil is delivered from the outer oil cylinder 10 to the inner oil cylinder 20, the rod member 30 is moved forwards to lift the load. In order to let hydraulic oil pass between the outer oil cylinder 10 and the inner oil cylinder 20, an air hole 101 is provided at the peripheral wall of the outer oil cylinder 10 for enabling outside air to pass into the outer oil cylinder 10 so that hydraulic oil can be completely drawn out of the outer oil cylinder 10 into the inner oil cylinder 20. However, hydraulic oil may leak out of the air hole 101 when returning to the outer oil cylinder 10. In order to eliminate this problem, a plug 102 or manual air valve may be used to seal the air hole 101. However, this structure of plug 102 cannot absolutely eliminate oil leakage. When a manual air valve is used, it must be opened upon each use of the hydraulic jack, and then closed after each use of the hydraulic jack. There is another conventional design, which provides a relatively bigger volume to hold hydraulic oil and air, preventing insufficient hydraulic oil suction action due to insufficient pressure difference at the end of the stroke. This design is an enclosed design. The main drawback of this design is its bulky size.

SUMMARY OF THE INVENTION

The present invention has been accomplished to provide an air valve assembly for hydraulic jack, which eliminates the aforesaid drawbacks. According to one aspect of the present invention, the air valve assembly comprises a valve block, the valve block having a threaded front neck for mounting, a longitudinal center through hole, and a radial air hole in communication between the longitudinal center through hole and the atmosphere, an air guide block mounted inside the valve block, the air guide block having a spiral groove around the periphery in communication between two distal ends of the longitudinal center through hole of the valve block, a stop plate fixedly mounted inside the valve block above the air guide block, the stop plate having a center round hole for the passing of flow means, and a felt element fixedly mounted inside the valve block and attached to the stop plate at the top and aimed at the radial through hole of the valve block to stop hydraulic oil from passing out of the center round hole of the stop plate and to let outside air pass from the radial through hole of the valve block through the center round hole of the stop plate into the space inside of the valve block below the stop plate. According to another aspect of the present invention, a rubber retainer is provided and secured to the valve block to hold a screw bolt adapted for mounting in the air hole on the outer oil cylinder of the hydraulic jack to seal the air hole when the hydraulic jack is not in use. The rubber retainer comprises a first O-ring fastened to the threaded neck of the valve block, a second O-ring fastened to the screw bolt, and a wire rod connected between the first O-ring and the second O-ring.

BRIEF DESCRIPTION OF THE DRAWINGS

FIG. 5 is a sectional view showing the screw bolt fastened to the air hole on the outer oil cylinder of the oil cylinder structure of a hydraulic jack according to the present invention.

FIG. 6 is a plain view showing the installation of the present invention in the oil cylinder structure of the hydraulic jack.

DETAILED DESCRIPTION OF THE PREFERRED EMBODIMENT

Figure 1:
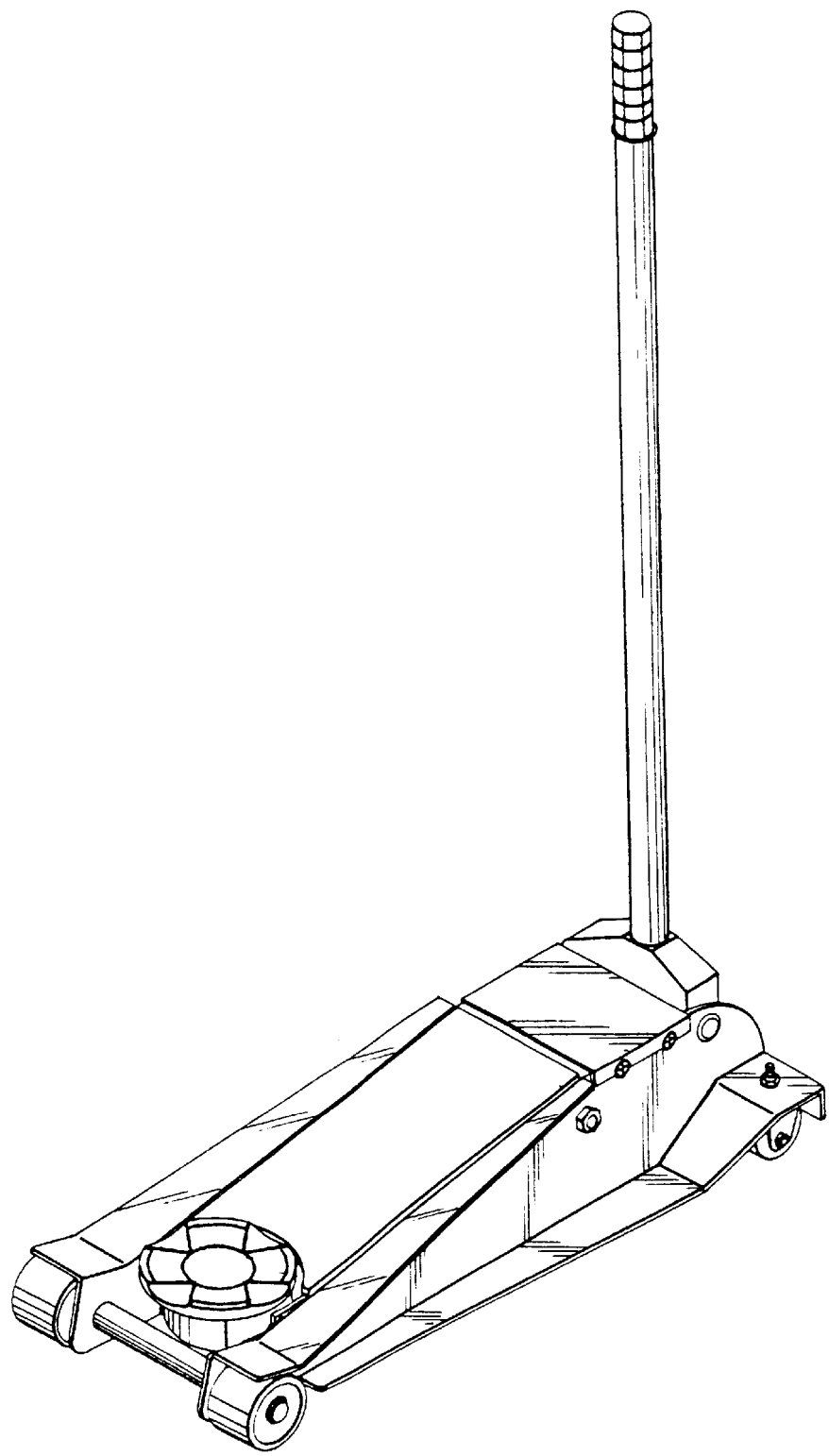
FIG. 1 is an elevational view of a conventional hydraulic jack.
Figure 2:
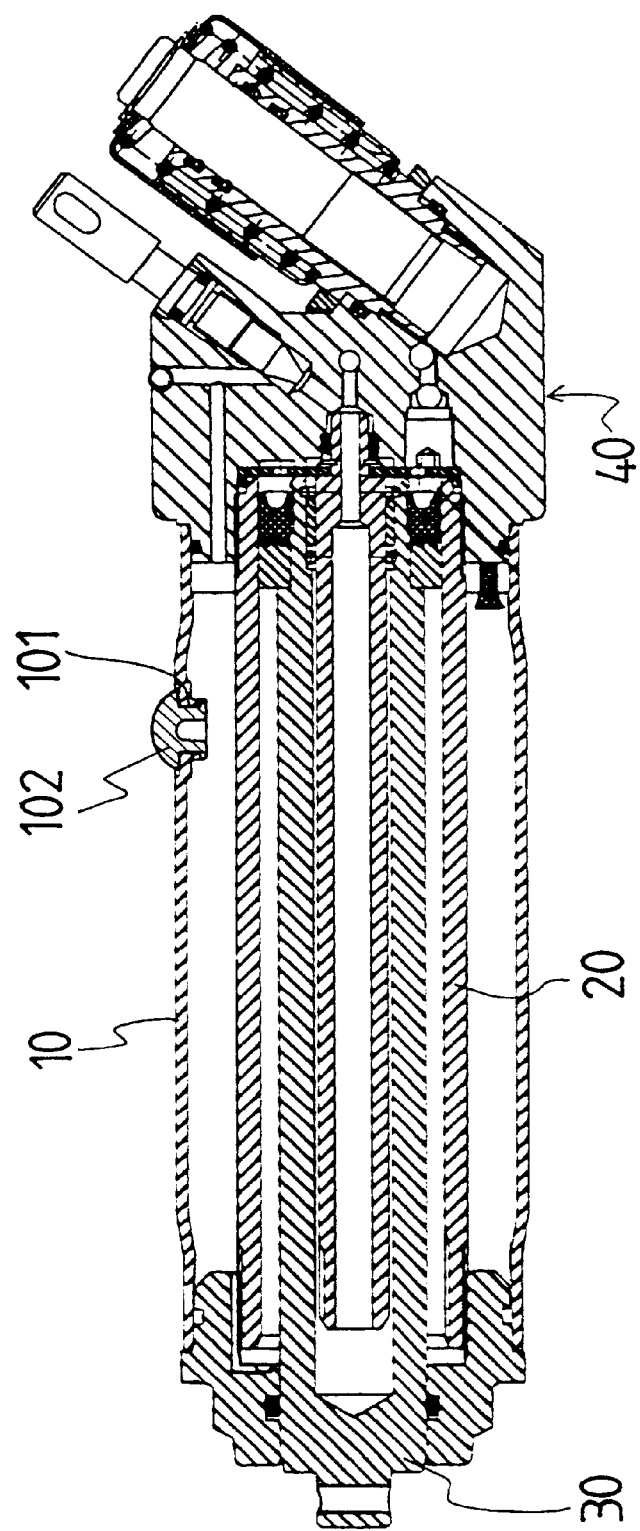
FIG. 2 is a sectional view of an oil cylinder structure for a hydraulic jack.
Figure 3:
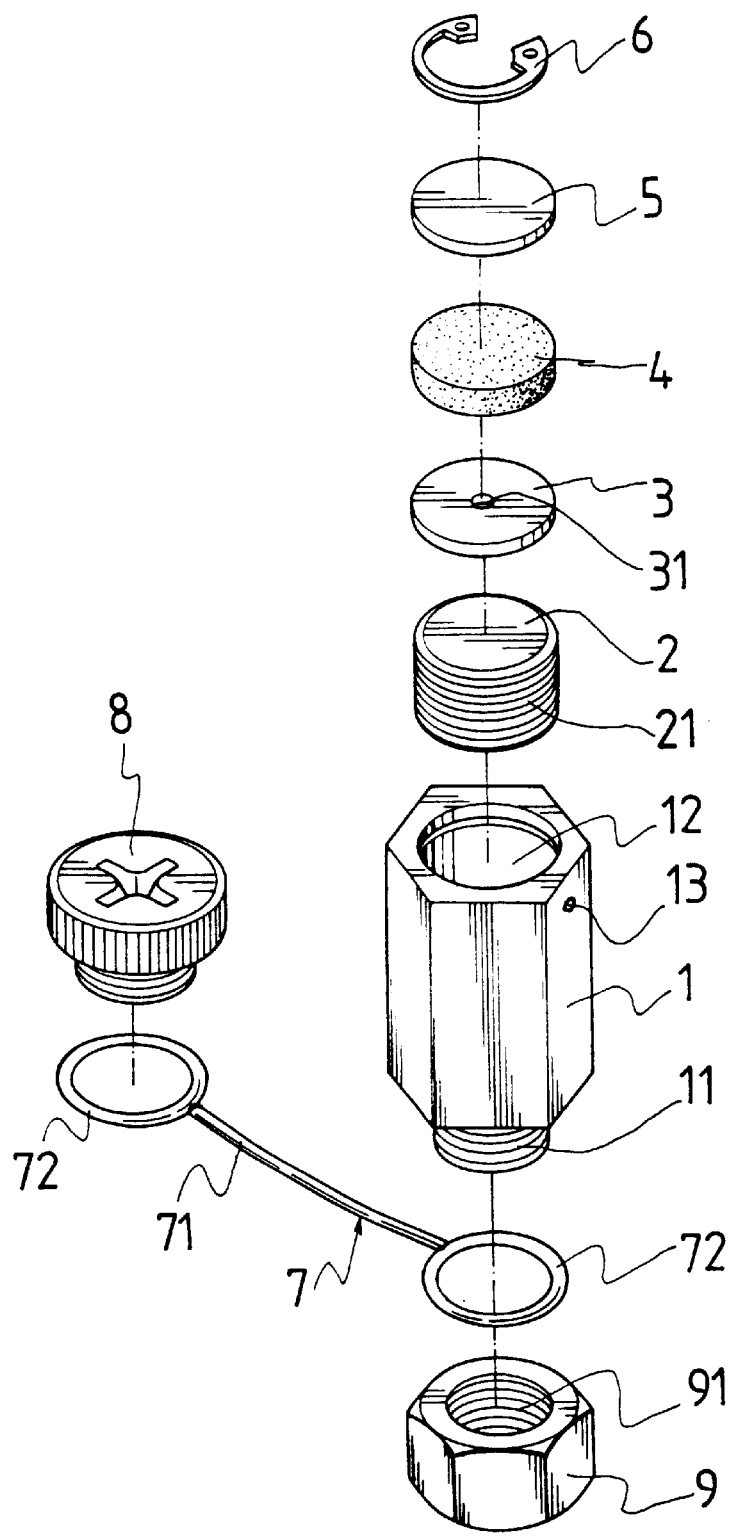
FIG. 3 is an exploded view of an air valve assembly for hydraulic jack according to the present invention.
Figure 4:
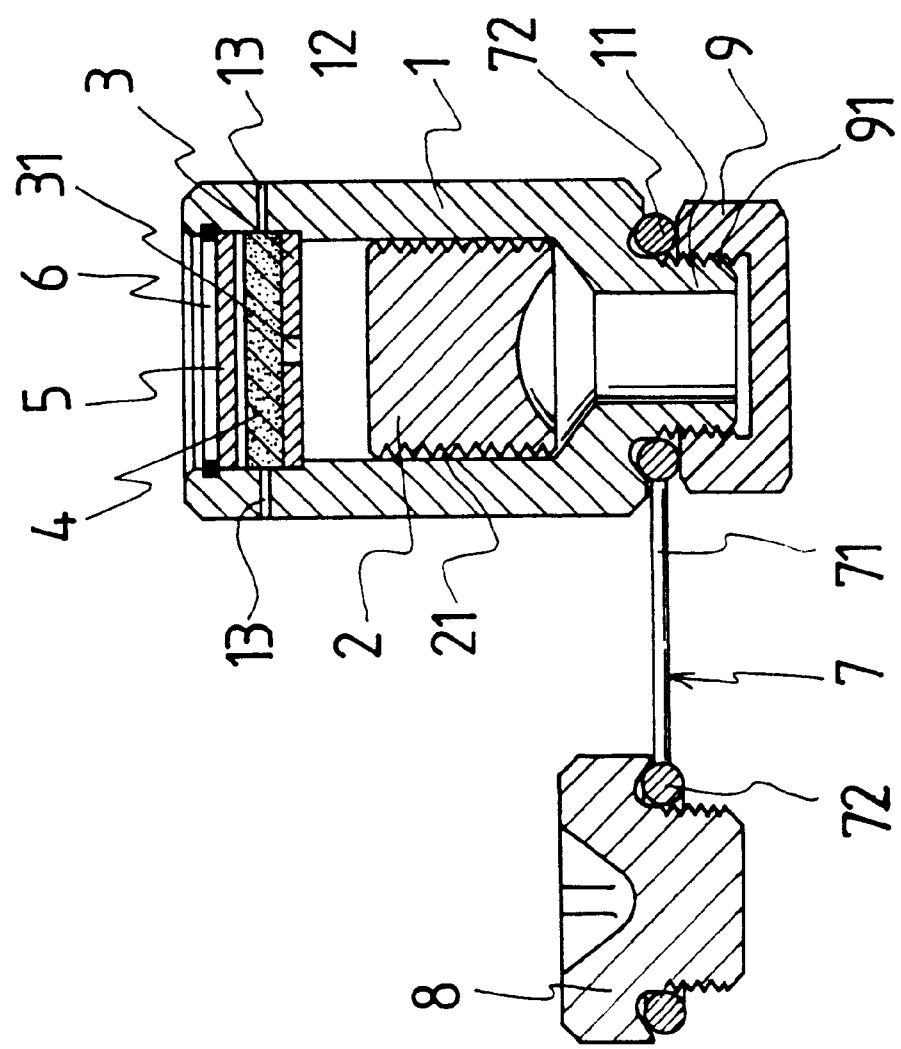
FIG. 4 is a sectional assembly view of FIG. 3.

Referring to FIGS. 3 and 4, an air valve assembly in accordance with the present invention comprises a valve block 1, an air guide block 2, a stop plate 3, a felt element 4, and a dust plate 5. The valve block 1 is a hollow hexagonal shell having a threaded neck 11 forwardly extended from the front side thereof, a longitudinal center through hole 12, and at least one air hole 13 radially extended through the peripheral wall thereof in communication between the longitudinal center through hole 12 and the atmosphere. The air guide block 2 is a cylindrical block molded from plastics, having a spiral groove 21 around the periphery. The stop plate 3 is a circular plastic plate having a round hole 31 at the center. Compressing felt material into a disk-like element makes the felt element 4. The dust plate 5 is a circular plate molded from plastics. The air guide block 2 is inserted into the longitudinal center through hole 12 of the valve block 1 from the rear side (the side remote from the threaded neck 11). After installation of the air guide block 2 in the valve block 1, air is allowed to pass between the two distal ends of the longitudinal center through hole 12 through the spiral groove 21 of the air guide block 2. The stop plate 3, the felt element 4 and the dust plate 5 are arranged in a stack and then inserted into the longitudinal center through hole 12 of the valve block 1, keeping the stop plate 3 suspended below the radial air hole 13 and the felt element 4 aimed the radial air hole 13 (see FIG. 4), and then a clamp 6 is installed in the valve block 1 to stop the inserted parts from escaping out of the valve block 1.

Referring to FIGS. 3 and 4 again, a rubber retainer 7 is provided to secure the valve assembly to a screw bolt 8. The rubber retainer 7 comprises two rubber O-rings 72 and a rubber wire rod 71 connected between the O-rings 72. The O-rings 72 of the rubber retainer 7 are respectively fastened to the threaded neck 11 of the valve block 1 and the threaded shank of the screw bolt 8. Further, a screw cap 9 is fastened to the valve block 1 to close one end, namely, the front end of the longitudinal center through hole 12. The screw cap 9 has an inner thread 91 threaded onto the threaded neck 11 of the valve block 1.

Figure 7:
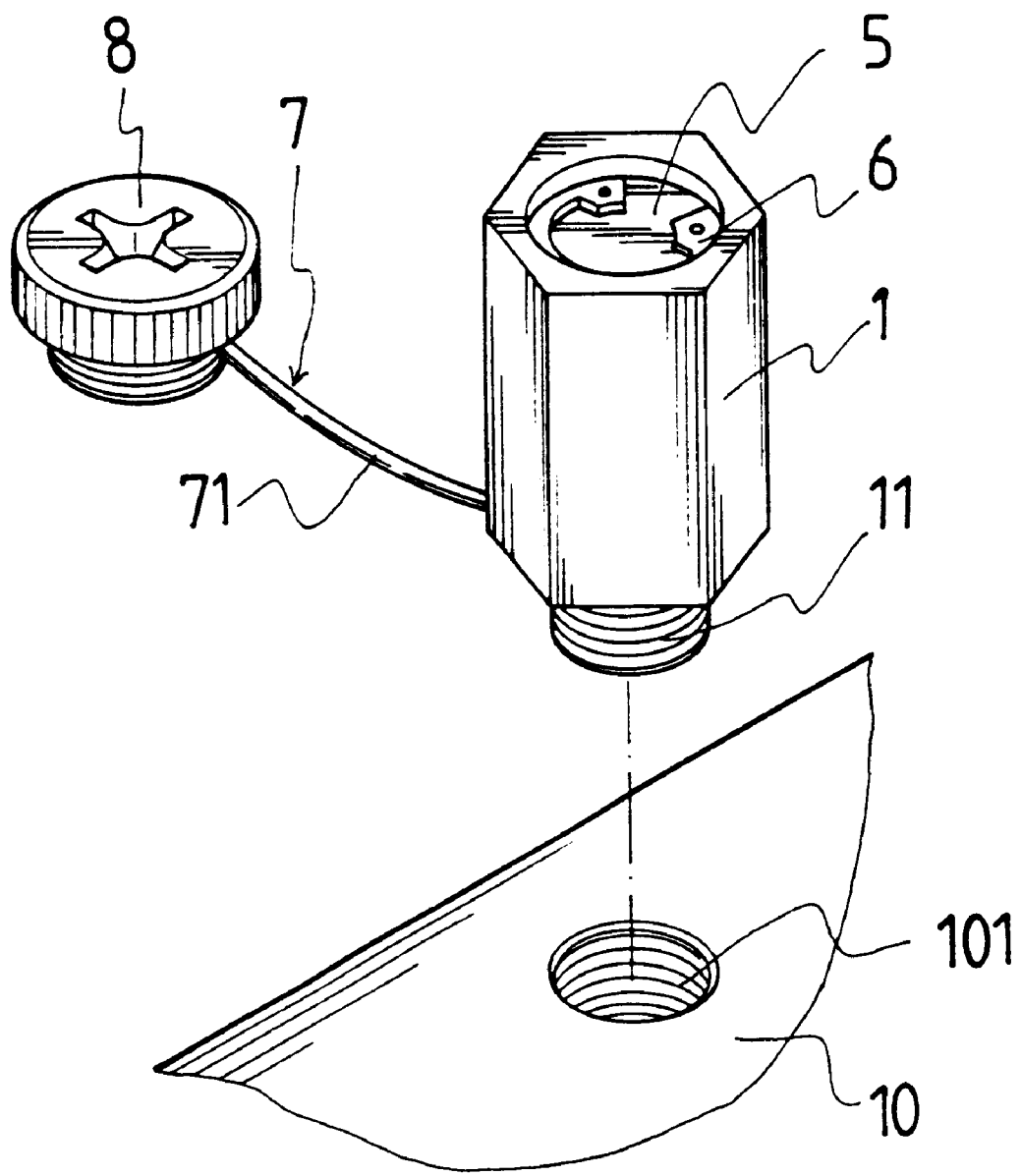
FIG. 7 is a perspective view showing the relationship between the present invention and the air hole on the outer oil cylinder.

Referring to FIGS. from 5 through 7, the screw bolt 8 is threaded into a threaded air hole 101 on the external oil cylinder 10 of the hydraulic jack to stop air from passing through the air hole 101 (see FIGS. 5 and 6), so that the hydraulic jack can be conveniently delivered from place to place, or kept in a warehouse. When using the hydraulic jack, the screw bolt 8 is removed from the air hole 101, the screw cap 9 is disconnected from the valve block 1, and the threaded neck 11 of the valve block 1 of the air valve assembly is threaded into the air hole 101 on the external oil cylinder 10 of the hydraulic jack (see FIG. 7). After installation of the air valve assembly in the air hole 101, one rubber O-ring 72 of the rubber retainer 7 well seals the gap between the air hole 101 and the valve block 1. When the movable rod member 30 in the inner oil cylinder 20 of the hydraulic jack is operated, the air valve assembly keeps the internal air pressure of the hydraulic jack in balance with the atmospheric pressure, and preventing hydraulic oil from leaking out of the outer oil cylinder 10.

Figure 8:
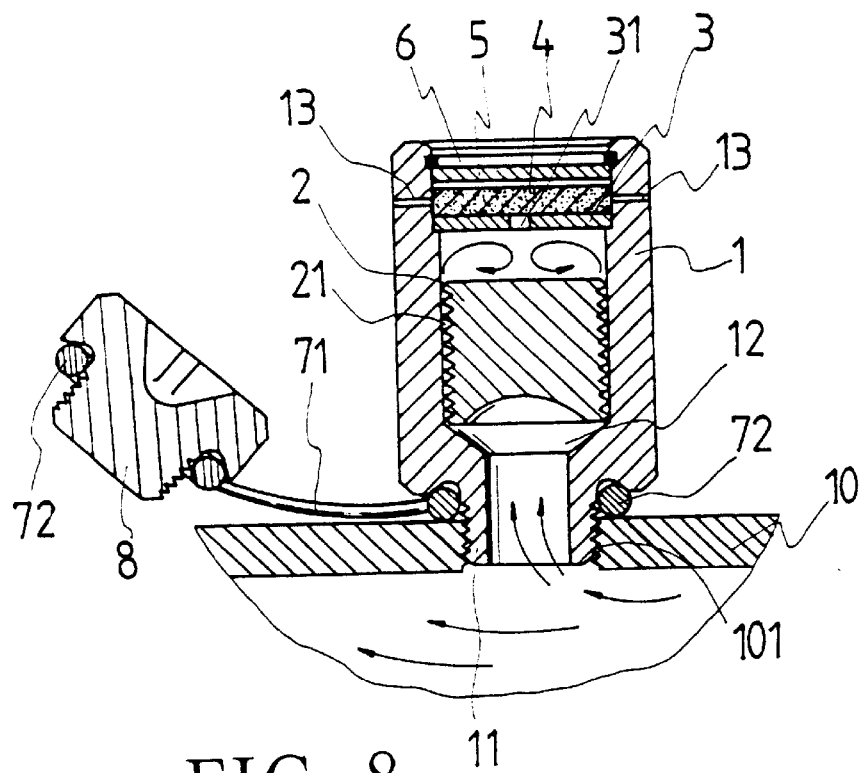
FIG. 8 is a sectional view showing hydraulic oil moved into the outer oil cylinder and the valve block of the air valve assembly according to the present invention.

Referring to FIG. 8, when hydraulic oil returns in the outer oil cylinder 10, it flows into the longitudinal center through hole 12 of the valve block 1 and then passes through the spiral groove 21 around the periphery of the air guide block 2 to the space between the air guide block 2 and the stop plate 3. When hydraulic oil passes through the spiral groove 21 to the space between the air guide block 2 and the stop plate 3, the pressure of the forwarding flow of hydraulic oil is buffered and slowed down. After passed to the space between the air guide block 2 and the stop plate 3, hydraulic oil is stopped from forward movement by the stop plate 3 and the felt element 4. Because of high surface tension and high viscosity, hydraulic oil cannot pass through the felt element 4.

Figure 9:
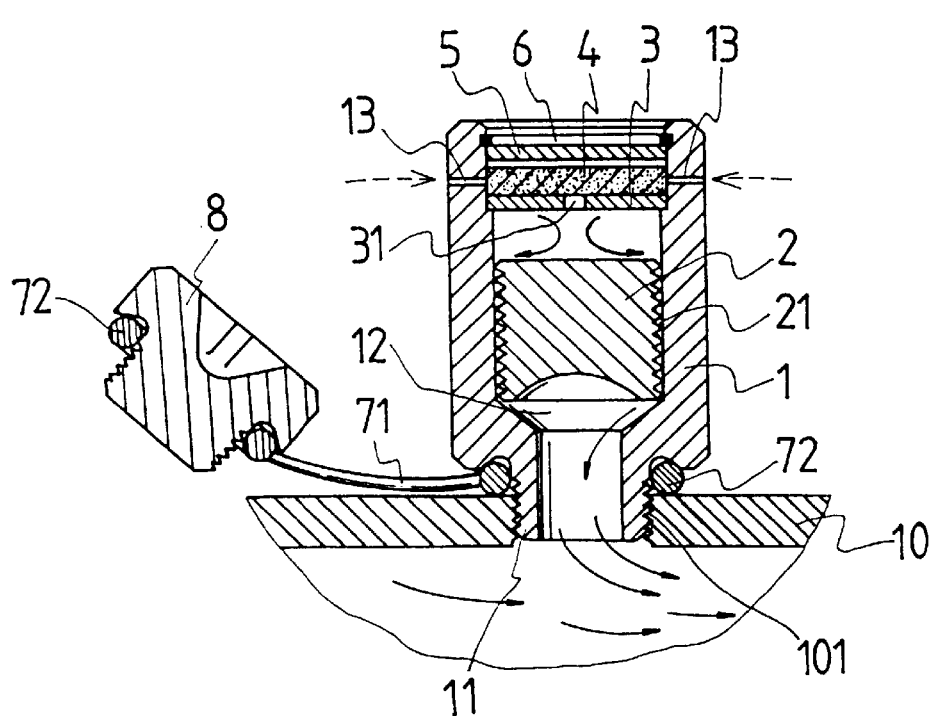
FIG. 9 is similar to FIG. 8 but showing hydraulic oil drawn away from the valve block of the air valve assembly and the outer oil cylinder, outside air passed into the inside of the valve block through the radial air hole on the valve block.

Referring to FIG. 9, when hydraulic oil is sucked into the inner oil cylinder 20 to cause a lifting action, the suction force draws a part of hydraulic oil out of the air valve assembly through the spiral groove 21 into the outer oil cylinder 10, and at the same time external air passes through the air hole 13, the felt element 4, the round hole 31 of the stop plate 3 and the spiral groove 21 of the air guide block 2 to the inside of the outer oil cylinder 10, causing residual hydraulic oil to be completely drawn away from the outer oil cylinder 10 for working.

While only one embodiment of the present invention has been shown and described, it will be understood that various modifications and changes could be made thereunto without departing from the spirit and scope of the invention disclosed. For example, equivalent members can replace the dust plate 5, the clamp 6 and the rubber retainer 7.

What the invention claimed is:

1. An air valve assembly adapted for mounting in the air hole on the outer oil cylinder of a hydraulic jack, comprising:

a polygonal valve block, said valve block comprising a threaded neck forwardly extended from a front side thereof adapted for threading into the air hole on the outer oil cylinder of a hydraulic jack, a longitudinal center through hole, and at least one air hole radially extended through the periphery thereof in communication between said longitudinal center through hole and the atmosphere;

an air guide block mounted inside said longitudinal center through hole of said valve block adjacent to said threaded neck, said air guide block comprising a spiral groove around the periphery thereof in communication between two distal ends of said longitudinal center through hole of said valve block;

a stop plate fixedly mounted inside said valve block below said at least one radial through hole of said valve block and spaced above said air guide block, said stop plate having a center round hole for the passing of flow means; and a felt element fixedly mounted inside said valve block and attached to said stop plate at a top side and aimed at said at least one radial through hole of said valve block to stop hydraulic oil from passing out of the center round hole of said stop plate and to let outside air pass from said at least one radial through hole of said valve block through the center round hole of said stop plate into the space inside of said valve block below said stop plate.

2. The air valve assembly of claim 1 further comprising a dust plate mounted inside said valve block above said felt element to protect said felt element against dust, and clamp means fastened to said valve block to secure said dust plate in place.

3. The air valve assembly of claim 1 further comprising a rubber retainer fastened to said valve block for holding a screw bolt, said rubber retainer comprising a first O-ring fastened to the threaded neck of said valve block, a second O-ring adapted for fastening to a screw bolt, and a wire rod connected between said first O-ring and said second O-ring.

4. The air valve assembly of claim 1 further comprising a screw cap adapted for threading onto said threaded neck of said valve block to close one end of said longitudinal center through hole of said valve block.

5. The air valve assembly of claim 2 wherein said air guide block, said stop plate and said dust plate are respectively molded from plastics.

6. The air valve assembly of claim 1 wherein said valve block is a hollow hexagonal shell.

* * * * *